Aug. 14, 1928.
F. E. CONLEY
BROOM RAKE
Filed Nov. 11, 1926
1,680,593
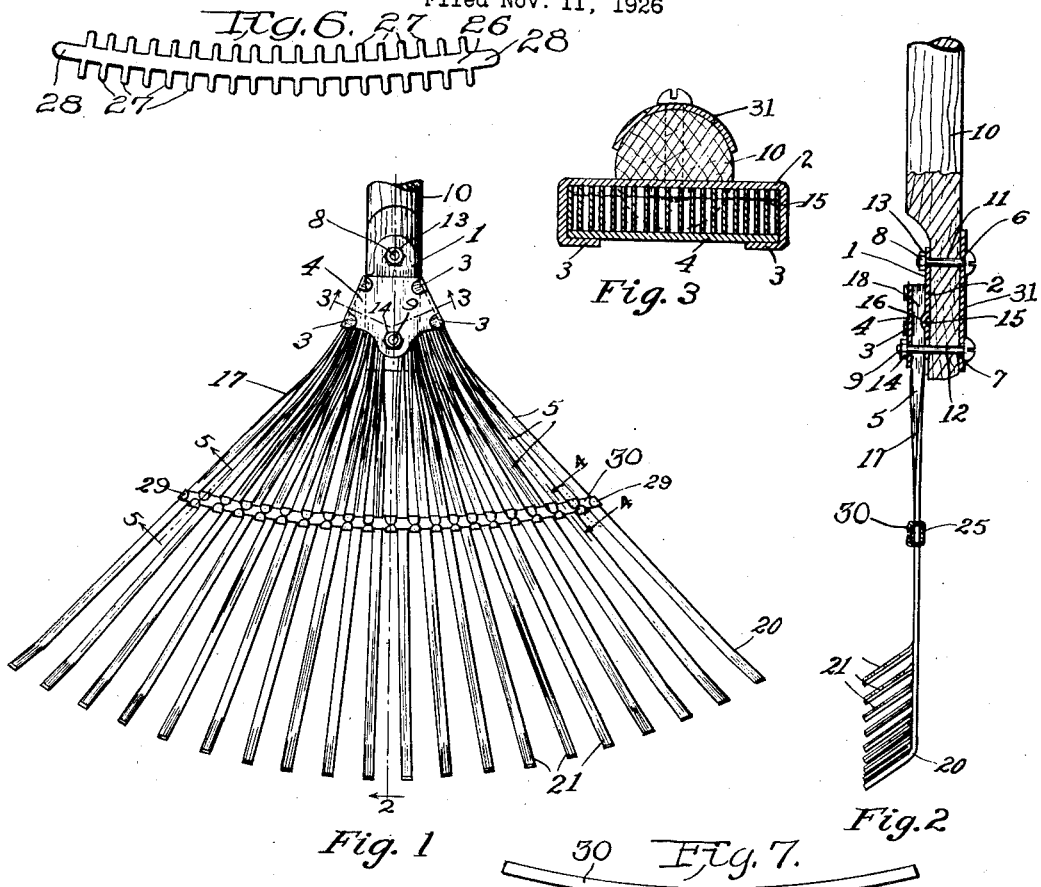
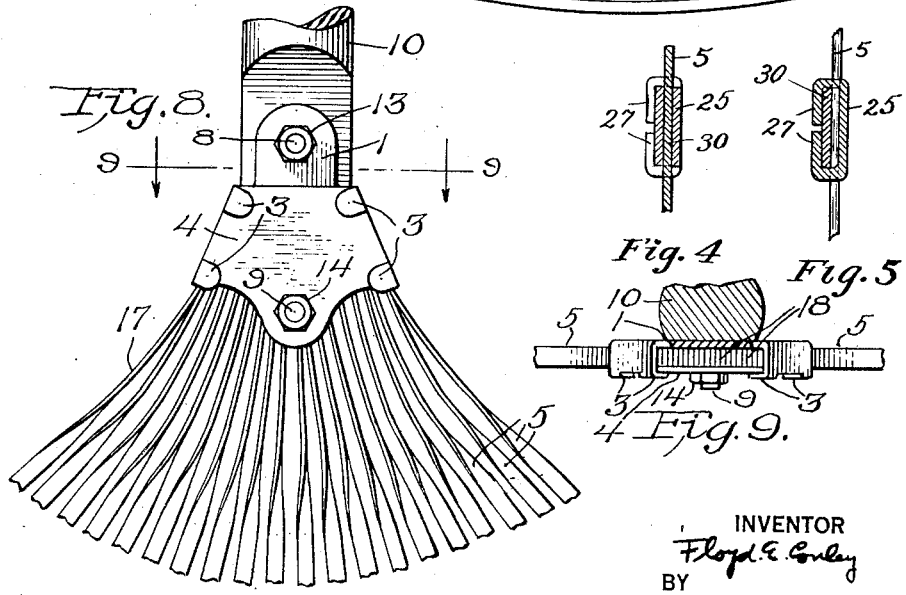
INVENTOR
Floyd E. Conley
BY
Franklin Slough
His ATTORNEY Patented Aug. 14, 1928.

1,680,593

UNITED STATES PATENT OFFICE.

FLOYD E. CONLEY, OF JACKSON, MICHIGAN, ASSIGNOR TO THE AMERICAN FORK & HOE COMPANY, A CORPORATION OF OHIO.

BROOM RAKE.

Application filed November 11, 1926. Serial No. 147,655.

My invention relates to broom rakes and relates particularly to broom rakes having metallic tines.

An object of my invention is to provide an improved form of broom rake wherein like metallic strips are assembled together into a broom to provide a broom having the qualities of strength, flexibility and durability, to an exceptional degree.

Another object of my invention is to provide an improved form of broom rake which may be inexpensively manufactured and which will be durable and efficient in use.

Another object of my invention is to provide an improved form of broom rake in which hand operations in the making of the rake are largely avoided.

Another object of my invention is to provide an improved form of broom rake having elongated tines, of light weight and in which the flexibility and resistance to flexure is very efficiently distributed along the length of the tines.

Other objects of my invention and the invention itself will become apparent by reference to the following description of an embodiment of my invention and in which description reference will be had to the accompanying drawings illustrating the said embodiment.

Fig. 1 shows a broom rake embodying my invention in plan view.

Fig. 2 shows a vertical medial sectional view of the said embodiment.

Fig. 3 shows an enlarged sectional view taken on the line 3—3 of Fig. 1.

Figs. 4 and 5 show enlarged fragmentary sectional views taken on the lines 4—4 and 5—5, respectively, of Fig. 1.

Fig. 6 shows an enlarged plan view of a re-enforcing element employed on the foregoing embodiment in blank form.

Fig. 7 shows an enlarged plan view of a re-enforcing bar employed in the foregoing embodiment.

Fig. 8 shows a plan view of the embodiment of Fig. 1, enlarged to more clearly illustrate the twist in the tines, and Fig. 9 shows a transverse sectional view taken on the line 9—9 of Fig. 8.

Referring now to the different figures of the drawings in all of which like parts are designated by like reference characters, at 1, I, generally, show a clamp comprising a substantially V-shaped metallic plate 2 having upwardly extending inturned flanges 3 adapted to retain a top plate 4 in contact with a plurality of metallic tines 5 clamped together in a group in the clamp 1. Apertures 6 and 7 are provided in the plate 2 and grip plate 31 for the reception of bolts 8 and 9 to secure the clamp 1 and tines 5 on a handle 10, which bolts pass through apertures 11 and 12 provided in the handle for that purpose and are secured together by the nuts 13 and 14. An inwardly extending transverse detent 15 is preferably stamped in the plate 2 adapted to project into slots 16 cut in each of the tines adjacent their handle ends to prevent their dislodgment from the clamp when the top plate has been secured in place by the inturned flanges 3. Before the tines are tempered and before they are placed within the clamp 1 they are twisted at substantially 90 degrees upon themselves at 17 free of, but adjacent the clamp 1, to present their flat portions 18 extending away from the handle, and to provide for better clamping of the tines in the clamp; they are also formed with bent ends 20 to form fingers 21 before being tempered. The tines are preferably formed from spring sheet steel, of a hardness and temper so that they will not be brittle and easily subject to breakage, but at the same time, so hard that the times will be quite resilient, and when deflected and the deflecting pressure being removed will be restored to normal undeflected form. The dimensions of the tines will depend upon the nature of usage to which the rake will be subjected.

By virtue of the inclined flanges 3 and the twist in the tines they extend from the clamp in a fan like formation and preferably present an arcuate end configuration for contact with the surface to be raked.

Intermediate the ends of the tines I provide a reenforcement 25 disposed at such a point that it will effectually retain the tines assembled and to re-enforce the tines, and at the same time being so disposed so that it will effect a proper resiliency in the finger ends of the tines. The said re-enforcement preferably comprises an arcuate shaped strip of steel 26 having a plurality of laterally projecting fingers or flanges 27 projecting from each side of the strip 26, at predetermined spaced intervals from end to end. The fingers or flanges are so spaced apart as to provide for a tine to be disposed between two of them when applied to the tines. This strip is best shown in blank form in Fig. 6 of the drawings. The ends of the strip 26 are rounded at 28 to provide fingers or flanges 29 to be bent around the most laterally disposed tines to clamp them. At 30 I show a strip of sheet steel adapted for co-operation with the strip 26 and of arcuate formation having the same degree of curvature as the strip 26.

The re-enforcement just described is applied to the tines after they have been placed in the clamp 1 by initially bending the fingers or flanges 27 and 29 into an upright position and inserting the strip from the underside of the tines so that the fingers or flanges extend above the tines, and the fingers or flanges 29 extend beyond the outermost tines. The strip 30 is then placed on the tines on the opposite side from the strip 26 and between the upstanding flanges or fingers. The strip 30 is shorter than the strip 26 and the ends thereof are disposed between the flanges or fingers 29. The rake is now placed in a power press and the fingers or flanges 27 and 29 are simultaneously bent inwardly and securely grip the strips 26 and 30 and the tines 5 together insuring a rigid re-enforcement for the tines.

The rake is adapted to be employed on lawns, gardens, gravel walks, and the like, and may be operated with a sweeping motion like that effected by a person operating an ordinary broom, permitting the person to stand erect, the raking being rendered less fatiguing.

The broom rake constructed as described with tines bound together by the intermediately disposed re-enforcing strips and twisted intermediate the re-enforcement and handle possesses a very desirable distribution of resiliency, the twisted tine portions resisting deflection more than untwisted tines could do, and the re-enforcement accomplishing a similar result to the stitching of ordinary brooms, in the distribution of resiliency and resistance to bending when the broom is used.

At the same time the twisted tines at the handle end are capable of being bundled together in a small compass, flat sides towards each other and contacting at the tine ends. Also the twisting of the tines together with the notching of the same permits the effective use of a detent such as that shown at 15, projecting into the notches to prevent longitudinal displacement of the tines.

Having thus described my invention in a single embodiment I am aware that numerous and extensive departures may be made from the embodiment herein illustrated and described but without departing from the spirit of my invention.

I claim:

1. In a broom rake, the combination with a handle, of a plurality of flat metal strips forming rake tines divergingly extending therefrom and each secured at an end thereto, each having its other end bent to form a ground engaging tip, reinforcing means joining the tines together intermediate their ends, said tines being twisted at substantially right angles intermediate the reinforcing means and the handle.

2. In a broom rake, the combination with a handle, of a plurality of flat metal strips forming rake tines divergingly extending therefrom and each secured at an end thereto, each having its other end bent to form a ground engaging tip, reinforcing means joining the tines together intermediate their ends, said tines being twisted at substantially right angles intermediate the reinforcing means and the handle, and clamping means carried by the handle for the handle ends of the tines to secure them together with the flat sides of each inner tine clamped tightly against contacting flat sides of adjacent tines.

3. In a broom rake, the combination with a handle, of a plurality of flat metal strips forming rake tines divergingly extending therefrom and each secured at an end thereto, each having its other end bent to form a ground engaging tip, reifnorcing means joining the tines together intermediate their ends, said tines being twisted at substantially right angles intermediate the reinforcing means and the handle, and clamping means carried by the handle for the handle ends of the tines to secure them together with the flat sides of each inner tine clamped tightly against contacting flat sides of adjacent tines, said clamping means comprising a substantially triangular metallic housing for the tine ends, and means securing the housing to the handle.

4. In a broom rake, the combination with a handle, of a plurality of flat metal strips forming rake tines divergingly extending therefrom and each secured at an end thereto, reinforcing means joining the tines together intermediate their ends, said reinforcing means comprising a pair of superposed arcuate metallic resilient strips extending transversely of the tines and on opposite sides thereof, adapted to resiliently yield to bending stresses applied at either of their end portions, and means to secure the strips together, said means extending between adjacent tines, one of said strips having lateral flanges projected between adjacent tines, the ends of said flanges being bent over the outer surface of the other strip to clamp the tines securely between the strips, said flanges adapted to space adjacent tines.

5. In a broom rake, the combination with a handle, of a plurality of flat metal strips forming rake tines divergingly extending therefrom and each secured at an end thereto, each having its other end bent at an obtuse angle to form a ground engaging tip, said tines being twisted at substantially right angles intermediate their ends.

6. In a broom rake, the combination with a handle, of a plurality of flat metal strips forming rake tines divergingly extending therefrom and each secured at an end thereto, each having its other end bent to form a ground engaging tip, reinforcing means joining the tines together intermediate their ends, said tines being twisted in their intermediate portions.

7. In a broom rake, the combination with a handle, of a plurality of flat metal strips forming rake tines divergingly extending therefrom and each secured at an end thereto, each having its other end bent to form a ground engaging tip, reinforcing means joining the tines together intermediate their ends, said tines being twisted at substantially right angles in their intermediate portions.

In testimony whereof I hereunto affix my signature this 23d day of Sept., 1926.

FLOYD E. CONLEY.